(No Model.) 2 Sheets—Sheet 1.

C. GREAVES.
FERTILIZER DISTRIBUTER.

No. 399,399. Patented Mar. 12, 1889.

WITNESSES:
Phil C. Dieterich.
C. Sedgwick.

INVENTOR:
C. Greaves
BY Munn & Co.
ATTORNEYS.

N. PETERS. Photo-Lithographer, Washington, D. C.

(No Model.) 2 Sheets—Sheet 2.

C. GREAVES.
FERTILIZER DISTRIBUTER.

No. 399,399. Patented Mar. 12, 1889.

WITNESSES: INVENTOR:
C. Greaves
BY
ATTORNEYS.

UNITED STATES PATENT OFFICE.

CHARLES GREAVES, OF MOUNT LEBANON, NEW YORK.

FERTILIZER-DISTRIBUTER.

SPECIFICATION forming part of Letters Patent No. 399,399, dated March 12, 1889.

Application filed August 21, 1888. Serial No. 283,353. (No model.)

*To all whom it may concern:*

Be it known that I, CHARLES GREAVES, of Mount Lebanon, in the county of Columbia and State of New York, have invented a new and Improved Fertilizer-Distributer, of which the following is a full, clear, and exact description.

My invention relates to a machine for distributing commercial fertilizers of all kinds, either wet or dry—such as phosphate, lime, salt, ashes, ground bone, &c.; and the object of the invention is to provide a simple, economical, and thoroughly efficient machine whereby the fertilizer may be distributed evenly in any desired quantity to the acre.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1:
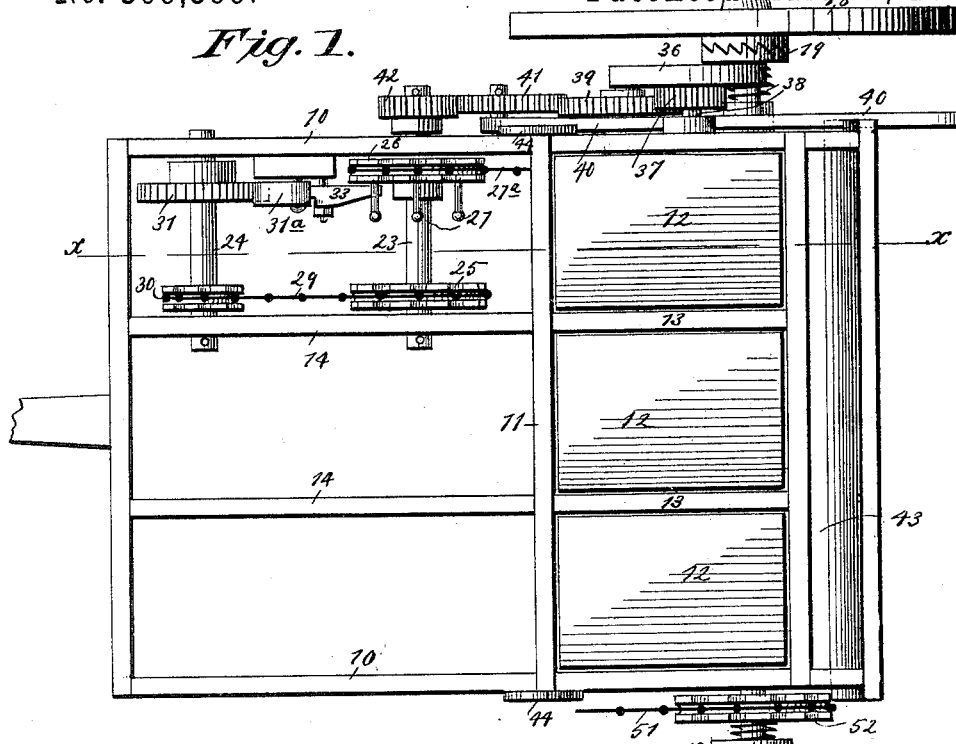
Figure 3:
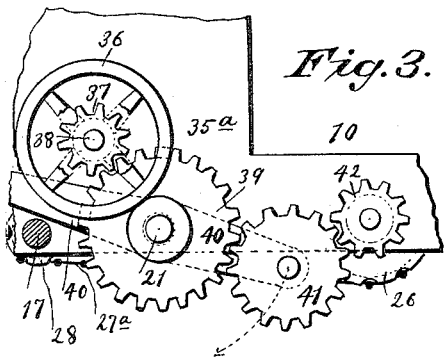
Figure 2:
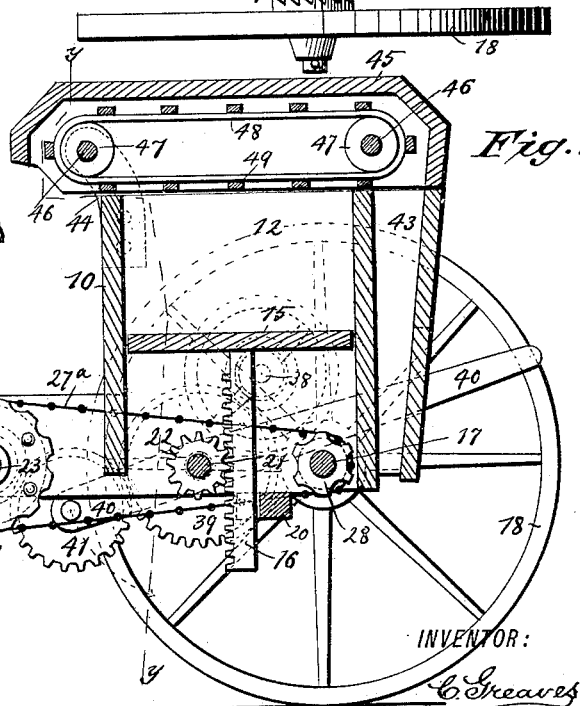
Figure 4:
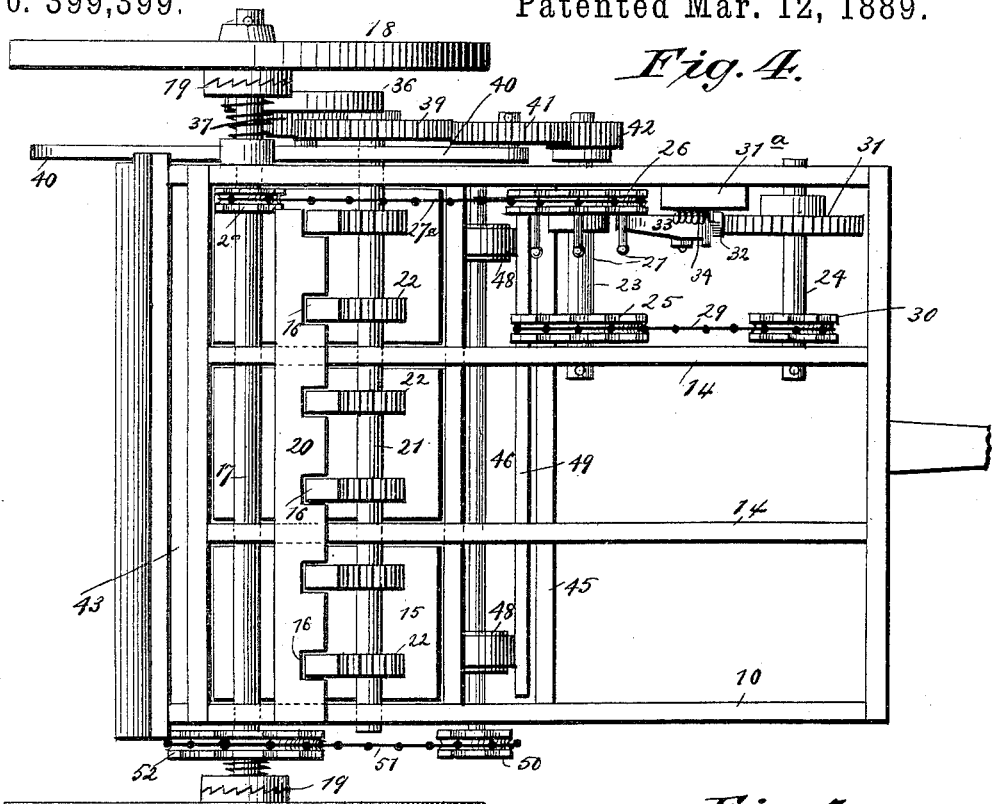

Figure 1 is a plan view of the machine with the top of the hopper removed. Fig. 2 is a longitudinal section on line $x$ $x$ of Fig. 1. Fig. 3 is a detail view of the gearing employed to transmit motion. Fig. 4 is a bottom plan view, and Fig. 5 is a transverse section taken vertically through the hopper.

Figure 5:
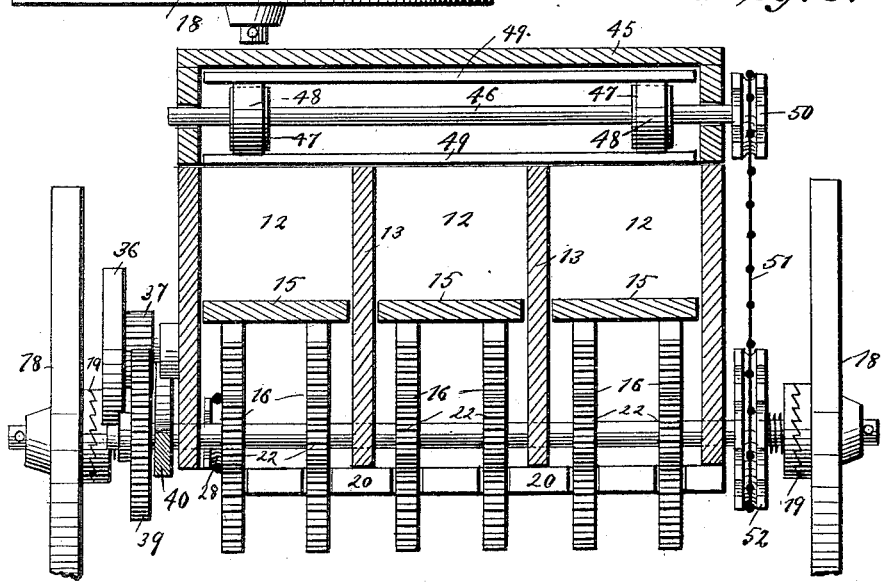

In carrying out the invention the frame 10 of the machine is preferably rectangular, and upon the rear end of the frame a hopper, 11, is transversely secured, which hopper is divided into a series of compartments, 12, by transverse partitions 13, as best shown in Fig. 5. The frame is preferably strengthened by a series of longitudinal spaced beams, 14, which beams are respectively attached to the forward end of the frame and to the hopper; or the said beams may extend through the hopper to the rear of the frame and constitute a portion of the partitions 13. Each of the several compartments of the hopper are provided with a vertically-adjustable bottom, 15, and to the under side of said vertical adjustable bottoms, which for convenience I will denominate "followers," vertical spaced racks 16 are projected, as best shown in Figs. 2 and 5.

In the frame 10 near the rear an axle, 17, is journaled, provided at each end with drive-wheels 18. The drive-wheels 18 are secured to the shaft by means of a clutch, 19, one section of the clutch being integral with the inner face of the wheel-hub and the other opposing section being made fast to the said axle. The clutch 19 is so formed that the two sections will rigidly engage as the frame is drawn forward and pass one another freely when the said frame is backed.

The racks 16 of the followers are guided and supported in their vertical movement by a notched bar, 20, attached transversely to the under side of the frame in advance of the axle 17, and in advance of the forward or toothed surface of the racks 16 a shaft, 21, is journaled in the frame, upon which shaft a series of pinions, 22, are keyed or otherwise attached, which pinions are adapted to mesh or engage, respectively, with the said racks 16, as best illustrated in Figs. 2 and 4.

To the left of the frame, in advance of the hopper 11, in the side bar and approaching or contiguous brace-bar 14, two spaced shafts, 23 and 24, are journaled. The shaft 23 is provided with a rigidly-attached sprocket-wheel, 25, adjacent to the brace-bar 13, and a second sprocket-wheel, 26, loose thereon near the side bar, upon the inner face of which latter sprocket-wheel a series of pins, 27, are secured. The pin-carrying sprocket-wheel 26 is connected by a chain belt, 27ª, with the sprocket-pinion 28, rigidly attached to the axle 17, and the sprocket-wheel 25 upon the said shaft 23 is connected by a chain, 29, with the sprocket-pinion 30, keyed to the short shaft 24.

Upon the end of the shaft 24 opposite to that carrying the sprocket-pinion 30 a ratchet-wheel, 31, is fastened, adapted to be engaged at or near the top by a pawl, 31ª, pivoted to the side bar of the frame, and at or near the under side by a dog, 32, pivoted upon one end of a lever, 33, the opposite end of which lever is adapted for engagement with the several pins 27, as best illustrated in Fig. 2. The under face of the extremity of the said lever 33, adapted to engage the said pins, is preferably beveled or ground off, as best shown in the same figure. Thus by the rotary movement of the pin-carrying sprocket-wheel 26 the lever 33 is depressed, causing the dog 32 to engage with the teeth of the ratchet-wheel 31 and revolve the same one or two teeth for every pin brought in engagement with the said lever, the pawl 31ᵃ retaining the ratchet-wheel in the position left by the movement of the said dog.

The dog 32 is spring-actuated in one direction, the spring 34 being attached to the lower extremity of the dog and to a vertical bracket, 35, projected downward from the side of the frame.

Upon the outer left side of the frame a differential gear, 35ᵃ, is journaled, consisting of a balance-wheel, 36, having an attached pinion, 37, pivoted upon a stud-spindle, 38, secured to the side of the hopper, and a large gear-wheel, 39, attached to the outer extremity of the shaft 21, which gear-wheel is adapted to mesh with the aforesaid pinion 37, as best shown in Fig. 3. Upon the outer end of the said shaft 21 a lever, 40, is fulcrumed, having pivoted to its forward extremity a gear-wheel, 41, of less diameter than the gear-wheel 39 and of greater diameter than the pinion 42, secured to the outer end of the short shaft 23. The pinion-shaft 21 is rotated by the engagement of the gear 41, respectively, with the gear 39 and the pinion 42 of the shaft 23, and the said pinion-shaft 21 may be stopped from rotating at any time by raising the lever 40, and thereby disengaging the shifting-gear 41 from the gear-wheel 42.

To the rear of the hopper 11 a downwardly-inclined chute, 43, is formed, extending from the base or bottom of the said hopper even with the top thereof. At each side of the hopper at the front outwardly-projecting brackets 44 are attached, in which brackets a cover, 45, is hinged. The said cover 45 is provided at front and rear with parallel longitudinal rotary shafts 46, carrying near each end a sprocket-wheel, 47, the transversely-aligning sprocket-wheels being connected by endless chain belts 48, and the two endless belts are in turn united by a series of strips, 49, of wood or other approved material, secured to the outer surface of the belts, as best illustrated in Fig. 2. The endless belts are so arranged in the cover that the strips upon the under side of the said belt as it is rotated pass directly over the top of the hopper. Motion is communicated to the endless belts 48 through the medium of a sprocket-pinion, 50, attached to the projected end of the forward shaft 46, which sprocket-pinion is connected by a chain belt, 51, with a sprocket-wheel, 52, attached to the axle between the clutch and the frame, as best illustrated in Fig. 5.

In operation, the several compartments 12 of the hopper having been filled with the fertilizer and the cover placed in position, as the machine is drawn forward and the pinion-shaft 21 thrown in gear with the short shaft 23, the said pinion-shaft 21 is revolved slowly, whereby the followers 15 are elevated, pressing the fertilizer at all times against the strips of wood upon the endless belts 48, and the said belt 48, rapidly revolving, carries the fertilizer from the upper surface of the hopper into the trough 43, from whence it finds a ready exit to the ground. When it is not desired to distribute the fertilizer through the medium of the lever 40, the pinion-shaft is thrown out of gear.

The pin-carrying sprocket-wheel 26 usually contains about twenty movable pins screwed in one side. One pin in the wheel will distribute about fifty pounds of ground bone-dust per acre, two pins one hundred pounds, and so on up to one thousand pounds per acre. The ratchet-wheel 31 is moved by the dog 32 one tooth for every tooth engaged by the lever 33.

By changing the location of the pins in the wheel 26, against which the dog-lever is drawn by the spring 34, the dog may be made to move two teeth at a time, and the quantity of fertilizer distributed be thereby doubled.

Having thus described my invention, what I claim as new, and desire to secure by Letters Patent, is—

1. In a machine for distributing fertilizer, the combination, with a hopper provided with a series of transverse compartments, followers held to vertically reciprocate in said compartments, and racks attached to the under surface of the said followers, of a shaft, pinions secured to the said shaft engaging said racks, a cover hinged to the said hopper, endless belts connected by slats rotating in said cover above and in connection with the upper surface of the hopper, and means, substantially as shown and described, for rotating the said belt and the said pinion-shaft, as and for the purpose specified.

2. In a fertilizer-distributer, the combination, with a hopper divided into a series of transverse compartments, followers vertically reciprocating in said compartments, racks secured to the under surface of the said followers, and a shaft provided with pinions engaging the said racks, of a chute secured to the rear of the hopper, open at the top and bottom, and of a height equal to that of the hopper, a cover closing the upper ends of the hopper and chute, shafts journaled in said cover, endless belts carried by said shafts, connected by spaced strips, and means, substantially as shown and described, for rotating the shafts in the cover and the pinion-shaft, whereby the fertilizer is brought into engagement with the endless belts and conveyed thereby to the chute, as set forth.

3. The combination, with a frame, an axle journaled in said frame, provided with a clutch-section, and drive-wheels journaled upon the axle provided with an engaging clutch-section, a hopper supported upon said frame, divided into a series of compartments, followers reciprocating in said compartments, racks attached to the under surface of the said followers, a shaft journaled in the frame, carrying pinions engaging with the said racks, and means, substantially as shown and described, for rotating the said pinion-shaft, of a chute formed at the rear of the hopper of equal height and width, a cover hinged to the hopper, parallel spaced shafts journaled in said cover, endless belts carried by the said shafts, provided with connected slats, a sprocket-pinion secured to the outer end of one of the said shafts, a sprocket-wheel attached to the axle, and a sprocket-belt connecting the said sprocket wheel and pinion, substantially as shown and described.

4. The combination, with a frame, an axle journaled in said frame at the rear, drive-wheels attached to the said axle by a clutch, a hopper secured to the frame, divided into compartments, followers reciprocating in said compartments, racks attached to the under side of the said followers, and a notched bar guiding the said racks, of a shaft journaled in the frame in advance of the axle, carrying pinions meshing with the said racks, a short drive-shaft journaled in advance of the pinion-shaft, provided with a pinion upon the outer end, a pin-carrying sprocket-wheel secured to the said shaft, connected by a chain belt with a sprocket-pinion upon the axle, a second short shaft belted to the said short drive-shaft, a ratchet-wheel attached to the forward short shaft, a lever pivoted to the side of the frame, engaging the pins of the said sprocket-wheel, a dog pivoted to the said lever, bearing against the ratchet-wheel, and means, substantially as shown and described, for throwing the pinion-shaft in and out of connection with the short drive-shaft, as and for the purpose specified.

CHARLES GREAVES.

Witnesses:
ROBERT VALENTINE,
FRANCES E. BURFITT.